(12) United States Patent
Seto et al.

(10) Patent No.: US 8,017,537 B2
(45) Date of Patent: Sep. 13, 2011

(54) GLASS ARTICLE AND METHOD OF PRODUCING THE SAME

(75) Inventors: Hiromitsu Seto, Tokyo (JP); Akihiro Koyama, Tokyo (JP); Yukihito Nagashima, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 441 days.

(21) Appl. No.: 12/084,072

(22) PCT Filed: Oct. 31, 2006

(86) PCT No.: PCT/JP2006/321766
§ 371 (c)(1), (2), (4) Date: Aug. 20, 2008

(87) PCT Pub. No.: WO2007/052666
PCT Pub. Date: May 10, 2007

(65) Prior Publication Data
US 2009/0181843 A1    Jul. 16, 2009

(30) Foreign Application Priority Data

Oct. 31, 2005  (JP) ................................ 2005-315532

(51) Int. Cl.
C03C 3/087 (2006.01)
B32B 17/00 (2006.01)
C03B 32/00 (2006.01)
C03B 27/044 (2006.01)

(52) U.S. Cl. ............. 501/71; 501/70; 65/136.4; 65/348; 65/349; 65/350; 65/351; 428/410; 428/426

(58) Field of Classification Search ............... 501/70, 501/71; 65/136.4, 348, 349, 350, 351; 428/410, 428/426
See application file for complete search history.

(56) References Cited

U.S. PATENT DOCUMENTS

| | | | |
|---|---|---|---|
| 4,300,936 A * | 11/1981 | Quillevere et al. | 65/114 |
| 5,837,629 A * | 11/1998 | Combes et al. | 501/70 |
| 5,952,255 A | 9/1999 | Seto et al. | |
| 5,998,316 A | 12/1999 | Seto et al. | |
| 6,103,650 A * | 8/2000 | Krumwiede | 501/71 |
| 6,274,523 B1 | 8/2001 | Krumwiede et al. | |
| 6,395,660 B1 | 5/2002 | Seto et al. | |
| 6,413,893 B1 * | 7/2002 | Shelestak et al. | 501/71 |
| 6,712,180 B2 * | 3/2004 | Levy | 182/153 |
| 6,764,973 B2 | 7/2004 | Berthereau et al. | |
| 6,953,758 B2 * | 10/2005 | Arbab et al. | 501/70 |
| 7,534,735 B2 * | 5/2009 | Coster et al. | 501/70 |
| 2003/0050175 A1 | 3/2003 | Seto et al. | |
| 2003/0061835 A1 * | 4/2003 | Yoda et al. | 65/114 |
| 2004/0186001 A1 * | 9/2004 | Seto et al. | 501/70 |

FOREIGN PATENT DOCUMENTS

| | | | |
|---|---|---|---|
| JP | 6-247740 A | | 9/1994 |
| JP | 8-67526 A | | 3/1996 |
| JP | 10-114540 A | | 5/1998 |
| JP | 10-139475 A | | 5/1998 |
| JP | 10-182183 A | | 7/1998 |
| JP | 2000143288 A | * | 5/2000 |
| JP | 2000-219534 A | | 8/2000 |
| JP | 2001-19471 A | | 1/2001 |
| JP | 2003-522706 A | | 7/2003 |

* cited by examiner

*Primary Examiner* — Karl Group
*Assistant Examiner* — Elizabeth A Bolden
(74) *Attorney, Agent, or Firm* — Hamre, Schumann, Mueller & Larson, P.C.

(57) ABSTRACT

The present invention provides a glass article using a glass composition including a base glass composition and colorants. The base glass composition includes, expressed in mass %: 65 to 80% of $SiO_2$; 0 to 5% of $Al_2O_3$; 0 to 10% of MgO; 0 to 15% of CaO; 5 to 15% of MgO+CaO; 10 to 18% of $Na_2O$; 0 to 5% of $K_2O$; 10 to 20% of $Na_2O+K_2O$; and 0 to 5% of $B_2O_3$, and the colorants consist essentially of, expressed in mass %: 0.6% to 1.0% of $T\text{-}Fe_2O_3$; 0.026 to 0.8% of $TiO_2$; 0 to 2.0% of $CeO_2$; 0.01 to 0.03% of CoO; 0 to 0.0008% of Se; and 0.06 to 0.20% of NiO. The glass article has a grayish color tone, and has a visible light transmittance in a range of 15% to 40%, which is measured with the illuminant A at a thickness of 3.1 mm.

10 Claims, 2 Drawing Sheets

GLASS ARTICLE AND METHOD OF PRODUCING THE SAME

TECHNICAL FIELD

The present invention relates to a glass article having a moderately low visible light transmittance. More particularly, it relates to a glass article having a grayish color tone so that it is suitable for use as a window glass for privacy glazing in a vehicle. The present invention further relates to a method of producing the glass article.

BACKGROUND ART

Recently, glasses having a variety of color tones have been proposed as window glasses of vehicles. Among them, a glass with a relatively low visible light transmittance preferably is used for a rear window glass of a vehicle in view of privacy protection. Such kinds of glasses include the following.

JP2001-19471A discloses a dark green colored glass including 0.7 to 1.6 wt % of $Fe_2O_3$ (total iron), 0.10 to 0.23 wt % of FeO, 0.010 to 0.100 wt 0% of CoO, 0.010 to 0.100 wt % of NiO, and 0 to 0.0008 wt % of Se.

JP2003-522706T discloses a gray glass composition with a total light transmission of at least 15% when measured at a thickness of 4.85 mm, including 0.25 to 0.65 wt % of $Fe_2O_3$, 150 to 250 wt. ppm of CoO, and less than 5 wt. ppm of Se.

The present applicant discloses, in JP10 (1998)-114540A, an ultraviolet/infrared absorbent low transmittance glass with an almost neutral color such as a bluish green or deep green color, including 1.2 to 2.2 wt % of total iron oxide ($T-Fe_2O_3$) expressed in terms of $Fe_2O_3$, 0.001 to 0.03 wt % of CoO, 0 to 0.0008 wt % of Se, and 0 to 0.2 wt % of NiO.

All of the well-known glasses having a grayish color tone include high concentrations of selenium. Selenium not only has a serious impact on the environment, but it is a substance that is very easily vaporized. Therefore, it is preferred to avoid the use of selenium.

A glass disclosed by the present applicant in JP10 (1998)-114540A does not have a grayish color tone but a bluish green or deep green color, although it includes only a small amount of selenium.

A glass disclosed in JP2001-19471A has only a dark green color, although it also includes only a small amount of selenium.

Furthermore, a glass disclosed in JP2003-522706T includes only a small amount of selenium and has a gray color tone. However, this glass composition has a problem that its ultraviolet transmittance is too high due to its relatively low content of $Fe_2O_3$.

DISCLOSURE OF INVENTION

In view of these circumstances, it is an object of the present invention to provide a glass article having a grayish color tone, as well as having a moderately low visible light transmittance. More preferably, it is an object thereof to provide a glass article having a low solar transmittance as well as a low ultraviolet transmittance. In addition, it is an object thereof to provide a method of producing the glass article.

More specifically, the present invention provides a glass article using a glass composition including a base glass composition and colorants.

The base glass composition includes, expressed in mass %:
65 to 80% of $SiO_2$;
0 to 5% of $Al_2O_3$;
0 to 10% of MgO;
5 to 15% of CaO;
5 to 15% of MgO+CaO;
10 to 18% of $Na_2O$;
0 to 5% of $K_2O$;
10 to 20% of $Na_2O+K_2O$; and
0 to 5% of $B_2O_3$.

The colorants consist essentially of, expressed in mass %:
0.6% to 1.0% of $T-Fe_2O_3$ (where $T-Fe_2O_3$ is a total iron oxide obtained by expressing the total amount of iron compounds as $Fe_2O_3$);
0.026 to 0.8% of $TiO_2$;
0 to 2.0% of $CeO_2$;
0.01 to 0.03% of CoO;
0 to 0.0008% of Se; and
0.06 to 0.20% of NiO.

This glass article has a grayish color tone, and has a visible light transmittance in a range of 15% to 40%, which is measured with the illuminant A at a thickness of 3.1 mm.

The present invention also provides a method of producing a glass article with a grayish color tone. This method includes:
a step A of obtaining a sheet-formed body from the above-mentioned glass composition; and
a step B of cooling, at a rate of 4K or higher per second, the sheet-formed body that is in a state of a higher temperature than a glass transition temperature of the glass composition.

The glass composition to be used for the glass article of the present invention includes appropriate amounts of $T-Fe_2O_3$, CoO and NiO. Therefore, the present invention can provide a glass article having a moderately low visible light transmittance as well as having a grayish color tone, while reducing the impact on the environment.

Furthermore, the preferred glass article of the present invention is obtained by cooling the glass article including the above glass composition at a relatively high cooling rate. Therefore, the present invention easily can provide a glass article having a grayish color tone.

The preferred glass composition to be used for the glass article of the present invention includes $CeO_2$ as an essential component. Since an appropriate amount of $CeO_2$ is included, the present invention easily can provide a glass article having a low ultraviolet transmittance as well.

According to the preferred glass composition to be used for the glass article of the present invention, the range of the above NiO content is more appropriately limited. Therefore, the present invention can more easily provide a glass article having a grayish color tone.

BEST MODE FOR CARRYING OUT THE INVENTION

The reasons for limiting the base glass composition of the glass composition to be used for the glass article of the present invention are as follows. Note that "mass %" will hereinafter be simply denoted as "%".

($SiO_2$)

$SiO_2$ is an essential component forming a skeleton of glass. Less than 65% content of $SiO_2$ lowers the durability of a glass composition, whereas more than 80% content of $SiO_2$ increases the viscosity of a glass melt, which results in difficulty in melting and refining the glass. Therefore, the $SiO_2$ content must be in the range of 65 to 80%. Furthermore, it is preferable, from the viewpoints of the above durability and melting/refining of the glass, that the lower limit of the $SiO_2$ content be 69% or more, and more preferably 70% or more. It is preferable that the upper limit of the $SiO_2$ content be 75% or less, and more preferably 73% or less.

($Al_2O_3$)

$Al_2O_3$ is not an essential component, but is used to improve the durability of a glass composition. $Al_2O_3$ exhibits a remarkable effect of improving the durability when its content is 0.1% or more. Therefore, it is preferable that the lower limit of the $Al_2O_3$ content be 0.1% or more, and more preferably 1.0% or more. Meanwhile, $Al_2O_3$ is a hard-to-melt component. When the $Al_2O_3$ content exceeds 5%, the excess amount of $Al_2O_3$ remains unmelted to form inclusion in the glass, and further makes it difficult to remove gas bubbles in the glass melt. Therefore, the upper limit of the $Al_2O_3$ content must be 5% or less, preferably 2.5% or less, and more preferably 1.8% or less.

(MgO)

MgO is not an essential component, but is used to improve the durability of a glass composition, as well as to adjust the devitrification temperature of the glass composition and the viscosity of the glass melt in the glass forming process. More than 10% content of MgO raises the devitrification temperature of the glass composition. In the present invention, the upper limit of the MgO content should be 10%. The MgO content is preferably in the range of more than 2% to at most 10%, and more preferably in the range of 2.5 to 5.5%.

(CaO)

CaO is an essential component to be used to improve the durability of a glass composition as well as to adjust the devitrification temperature of the glass composition and the viscosity of the glass melt in the glass forming process, just as with MgO. These effects are poor when the CaO content is less than 5%, whereas more than 15% content thereof raises the devitrification temperature.

Note that the durability of the glass composition is lowered when the total of the contents of MgO and CaO is less than 5%, whereas the devitrification temperature is increased when the total of the contents thereof exceeds 15%. The total of the contents of MgO and CaO is preferably at most 13%.

($Na_2O$ and $K_2O$)

$Na_2O$ is an essential component for improving the meltability of glass, and less than 10% content thereof makes it difficult to melt the glass. Meanwhile, more than 18% content thereof lowers the durability of the glass composition. The lower limit of the $Na_2O$ content is preferably 12% or more. $K_2O$ is an optional component for accelerating the melting of glass. Since $K_2O$ is an expensive material as compared to other component materials, a high $K_2O$ content raises the cost of the glass raw material. The $K_2O$ content is preferably 5% or less, and more preferably 2% or less. Furthermore, the melting acceleration effect is poor when the total of the contents of $Na_2O$ and $K_2O$ is less than 10%, whereas the durability of the glass is deteriorated when the total of the contents thereof exceeds 20%. The upper limit of the total of the contents of $Na_2O$ and $K_2O$ is preferably 16% or less.

($B_2O_3$)

$B_2O_3$ is not an essential component but a component having an effect of enhancing the absorption of light in the ultraviolet wavelength region, in addition to the effects of improving the durability and the meltability of a glass composition. When the $B_2O_3$ Content is High, the Effect of Absorbing light in the ultraviolet wavelength region extends to the visible wavelength region. This causes the glass to tend to be a yellowish color tone. In addition, $B_2O_3$ may cause a problem in the glass forming process due to its easily-vaporized property. For these reasons, the upper limit of the $B_2O_3$ content should be 5%. The content of $B_2O_3$ is preferably in the range of 0 to less than 2%.

The reasons for limiting the colorants in the glass composition to be used for the glass article of the present inventions are as follows. Note that "%" and "ppm" will hereinafter denote "mass %" and "parts per million by mass", respectively.

(Iron Oxide)

Iron oxides are present in the form of $Fe_2O_3$ and FeO in glass. In the present description, the content of these iron oxides is expressed as a content of a total iron oxide in terms of $Fe_2O_3$, and simply is denoted as $T\text{-}Fe_2O_3$. The content of FeO is expressed as a percentage of mass ratio of FeO to $T\text{-}Fe_2O_3$ when FeO is expressed as $Fe_2O_3$, and the value thereof simply is denoted as an FeO ratio.

$Fe_2O_3$ has an absorption peak in the ultraviolet wavelength region on the short wavelength side of the visible region, whereas FeO has an absorption peak in the infrared wavelength region on the long wavelength side of the visible region. Therefore, $Fe_2O_3$ is a component mainly for increasing the ultraviolet absorptivity, whereas FeO is a component mainly for increasing the infrared absorptivity.

In the glass composition to be used for the glass article of the present invention, the content of $T\text{-}Fe_2O_3$ should be 0.6 to 1.0%. When the $T\text{-}Fe_2O_3$ content is less than 0.6%, the visible light transmittance of the glass article using the glass composition becomes too high to obtain the privacy glazing effect. When the $T\text{-}Fe_2O_3$ content exceeds 1.0%, the visible light transmittance of the glass article using the glass composition becomes too low, so that the visibility required for a window glass decreases. In addition, the glass article tends to be a greenish tone and the grayish color tone cannot be obtained satisfactorily. Furthermore, when the $T\text{-}Fe_2O_3$ content exceeds 1.0%, the radiation heat of flame is absorbed considerably by the upper surface portion of the molten glass in melting the glass raw materials. Therefore, it becomes difficult to satisfactorily heat the molten glass that is located near the bottom part of the melting furnace in melting the glass. More preferably, the lower limit of the $T\text{-}Fe_2O_3$ content is 0.70% or more, and the upper limit thereof is less than 0.95%.

It is further preferable, in the glass composition to be used for the glass article of the present invention, that the FeO content, when expressed as $Fe_2O_3$, be in the range of 0.15 to 0.35%. By doing so, it is possible to give a further satisfactory heat-ray absorptivity to the glass article of the present invention. In this case, it is possible to achieve at most 40% of the total solar energy transmittance ($T_G$). More preferably, the FeO content, when expressed as $Fe_2O_3$, is in the range of 0.18 to 0.30%.

Furthermore, it is preferable, in the glass composition to be used for the glass article of the present invention, that the FeO ratio be in the range of 20 to 35%. When the FeO ratio is 20% or more, it is possible to achieve more easily the total solar energy transmittance of at most 40% for the glass article of the present invention. On the other hand, the FeO ratio exceeding 35% may cause silica-rich cord defect or silica scum in the glass melt, and may cause Ni-induced color defect in the finished glass article. In addition, when the FeO ratio exceeds 35%, the FeO content becomes excessively high, which results in an excessively low visible light transmittance. Preferably, the upper limit of the FeO ratio is 30% or less.

(CoO)

According to the glass composition to be used for the glass article of the present invention, the glass article with the desired grayish color tone can be obtained more easily by the presence of both CoO and $Fe_2O_3$ and the further presence of at least one of Se and NiO. The CoO content in the glass composition to be used for the glass article of the present invention is in the range of 0.01 to 0.03%. At least 0.01% content of CoO realizes the desired color tone, and at least 0.015% content thereof realizes the desired color tone more easily. On the other hand, when the CoO content exceeds 0.03%, the visible light transmittance becomes excessively low. The upper limit of the CoO content is preferably 0.025% or less, and more preferably less than 0.02%.

(NiO)

NiO is an essential component for reducing the excitation purity so as to obtain the desired color tone. The NiO content should be in the range of 0.06 to 0.20%. When the NiO content exceeds 0.20%, the visible light transmittance becomes excessively low, and Ni-induced color defect also may occur in the finished glass article. When the NiO content is less than 0.06%, the color tone of the glass article may not be the desired grayish color tone, particularly after it is heat tempered. The NiO content is preferably in the range of more than 0.1% to at most 0.20%.

($CeO_2$)

$CeO_2$ is not an essential component but is a component that is effective for ultraviolet absorption. In addition, it also is effective for adjusting the FeO ratio so as to adjust the color tone of the glass article. Cerium ions contained in glass are present in the form of $Ce^{3+}$ and/or $Ce^{4+}$. Among them, $Ce^{3+}$ particularly is effective in absorbing light in the ultraviolet wavelength region and less effective in absorbing light in the visible wavelength region. When only a small amount (for example, less than 0.5%) of $CeO_2$ is contained, it is very effective in shifting the redox equilibrium of the glass composition toward the oxidation side so as to lower the FeO ratio. As a result, the color tone of the glass article is turned into gray more easily, as well as the amount of $Fe_2O_3$ is increased so that the ultraviolet transmittance of the glass article is reduced more easily. Furthermore, when the $CeO_2$ content is equal to a predetermined level (for example, 0.5%) or higher, its ultraviolet absorption effect can be exerted more easily. Note that a high content of $CeO_2$ is not preferred in terms of cost because it is an expensive material. In the glass composition to be used for the glass article of the present invention, the $CeO_2$ content should be 2.0% or less. The upper limit of the $CeO_2$ content is preferably 1.2% or less. From the viewpoint of the above-mentioned ultraviolet absorption, the preferable $CeO_2$ content is at least 0.10%.

($TiO_2$)

$TiO_2$ is an essential component for improving the ultraviolet absorption. Its ultraviolet absorptivity is particularly high when it is present with FeO. $TiO_2$ may be added to the glass composition to be used for the glass article of the present invention as long as its content does not exceed 0.8%. When the $TiO_2$ content exceeds 0.8%, the glass composition tends to be a yellowish tone. On the other hand, in order to obtain the ultraviolet absorption effect sufficiently, the $TiO_2$ content needs to be around 0.026% or more. The $TiO_2$ content is preferably 0.5% or lower, and more preferably in the range of 0.03 to 0.1%.

—(Se)

Se is not an essential component but an auxiliary colorant. Se has an effect of imparting a pinkish color to a glass composition. Since the pinkish color is the complementary color of the color imparted by CoO, the excitation purity of the colored glass composition effectively can be reduced. Therefore, Se is effective in achieving the glass article with a grayish color tone. On the other hand, since Se has a serious impact on the environment, the Se content should be 0.0008% or less in the glass composition of the present invention, and preferably at most 0.0004%. Note that when Se is added in the glass composition of the present invention, 10% to 30% of the total Se contained in the glass batch is considered to remain in the glass. More preferably, the glass composition of the present invention is substantially free from Se.

Note that the phrase "be substantially free from a substance" is not intended to exclude the case where the substance is contained as an inevitable impurity, but means that its content is less than 0.0003%, for example.

(Other Components)

The glass composition to be used for the glass article of the present invention can include other trace components, as auxiliary colorants, impurities, and/or reducing agents, in addition to the respective base glass components and colorants described above. These trace components are one or more oxides selected from the group consisting of MnO, $V_2O_5$, $MoO_3$, CuO, $Cr_2O_3$, $SnO_2$, $Y_2O_3$, and a rare-earth oxide, and the total content of these components is 1% or less. Furthermore, the glass composition of the present invention may include 0.1% or less of ZnO, and more preferably 0.005 to 0.05% of ZnO. Inclusion of ZnO can make Ni-induced color defect less likely to occur in the finished glass article.

(Cooling Rate)

It is preferable that the glass article of the present invention use a glass sheet including the above glass composition that has been cooled at a rate of 4K or higher per second. Note that in the present description, the above cooling rate should be the average cooling rate during the cooling from a temperature that is higher by 100° C. than the glass transition temperature (Tg) of that glass composition to a temperature that is lower by 10° C. than Tg. It is more preferably that the glass article of the present invention use a heat tempered glass sheet made of the glass composition described above. Heat tempering can be carried out by any well-known method as long as about 90 to 110 MPa of surface compression stress can be applied to the glass sheet through the rapid cooling thereof by blasting cooling gas onto the surface of the glass sheet that has been heated to a predetermined temperature or higher. Examples of cooling rates in the above rapid cooling include rates in the range of at least 50 K to at most 100 K per second. The glass article of the present invention can have a grayish color tone more easily by using a glass sheet that has been cooled at a cooling rate of 4K or higher per second, and preferably a heat tempered glass sheet. The heat tempering can be carried out at temperatures in the range including the glass transition temperature (Tg).

For example, the glass sheet to be used for the glass article of the present invention can be produced by a well-known float process. In this case, the above-mentioned heat tempering can be carried out by the following procedure. First, a glass ribbon (sheet-formed body) is obtained from a glass melt made of the above glass composition. Next, this glass ribbon is transferred to the cooling chamber by a conveyor while keeping it at a temperature higher than the glass transition temperature of the above glass composition, and is subjected to the above-mentioned heat tempering in the cooling chamber. By successively performing the step A of obtaining a glass ribbon from a glass melt and the step B of heat tempering of the glass ribbon, it is possible to efficiently produce a glass sheet to be used for the glass article of the present invention while reducing the energy consumption. The timing of the heat tempering is, of course, not limited to the above timing, and the heat tempering may be carried out by heating again, to a temperature higher than the glass transition temperature, the glass sheet that previously has been annealed. For example, in the case where the glass article of the present invention is a window glass of a vehicle, a glass sheet needs to be bent so as to form it into a shape suitable for the window frame of the vehicle. This bending is generally carried out by cutting a glass sheet (sheet-formed body) obtained by the float process or the like into pieces of predetermined size and then heating and pressing them. Therefore, the above-mentioned heat tempering can be carried out when the glass sheet is cooled in this bending process.

Note that heat tempering can be carried out until the temperature of a glass ribbon or a glass sheet reaches a temperature lower than the glass transition temperature, for example until it reaches a temperature lower by 100 to 300° C. than the glass transition temperature. The type of a cooling gas is not particularly limited and any type of gas such as air, a nitrogen gas and an inert gas can be used, but room-temperature air commonly is used.

(Glass with a Color being Changed According to Cooling Rate)

A glass composition with a color being changed by controlling a cooling rate can be used for the glass article of the present invention. It is preferable that the glass article of the present invention use a glass sheet made of a glass composition having a color tone, after being annealed, expressed as $-9 \leq a^* \leq -4$ and $-5 \leq b^* \leq 13$, respectively, in the LAB color system of the C.I.E. (Commission Internationale d'Eclairage), when measured with the illuminant C at a thickness of 3.1 mm. The color of the above glass sheet is more preferably in the ranges of $-9 \leq a^* \leq -4$ and $-1 \leq b^* \leq 13$, and still more preferably in the ranges of $-9 \leq a^* \leq -6$ and $3 \leq b^* \leq 9$.

The glass article obtained by cooling the above-mentioned glass sheet at a cooling rate of 4K or higher per second can have a grayish color tone more easily. The glass article obtained by heat tempering of the above-mentioned glass sheet can have a grayish color tone still more easily.

(Change in Color According to Cooling Rate)

Although the mechanism of how the color changes according to the cooling rate has not been fully identified, the present inventors consider it to be as follows.

NiO is present in the form of $Ni^{2+}$ in glass. It is known that the absorption peak wavelength of $Ni^{2+}$ varies according to its coordination number. It is known that when $Ni^{2+}$ has 6 coordinating-atoms in glass, its absorption exists around 430 nm, which gives the glass a yellowish brown tone, whereas when $Ni^{2+}$ has 4 coordinating atoms, its absorption exists around 500 to 650 nm, which gives the glass a reddish violet tone.

It is believed that in the case of the glass article of the present invention, glass is heated until it reaches a temperature higher than the glass transition temperature and then cooled at a predetermined cooling rate or a higher rate, so that at least a part of the total $Ni^{2+}$ contained in the glass, and preferably a majority thereof can be $Ni^{2+}$ with 4 coordinating atoms. Even if the glass contains a small amount of Se or it is substantially free from Se, a grayish color tone can be obtained by proactively taking advantage of the absorption induced by $Ni^{2+}$ with 4 coordinating atoms as described above.

EXAMPLES

Hereinafter, the glass article of the present invention will be described further in detail referring to the following tables.

Examples 1 through 25

Production of Glass Sheets

A glass sheet was produced according to the following procedure. As raw materials for base glass components, silica sand, dolomite, limestone, soda ash, salt cake, and potassium carbonate were used. As raw materials for colorants, ferric oxide, titanium oxide, cerium oxide, cobalt oxide, metallic selenium, nickel oxide, and a carbonaceous reducing agent were used. The above raw materials were mixed together in predetermined percentages (see Tables 1 and 2), and thus raw glass batches (hereinafter referred to as "batches") were prepared.

The batches thus prepared were melted and refined in a platinum crucible. First, each batch was melted and refined, with the crucible being kept in an electric furnace at 1450° C. for 4 hours. Next, the glass melt was poured onto a steel plate outside the furnace so as to be about 6 mm thick, and then cooled to be solidified. Thus a glass member was obtained. Subsequently, this glass member was subjected to annealing treatment. This annealing treatment was carried out in such a manner that the glass member was kept in another electric furnace at 650° C. for 30 minutes and then cooled to room temperature by turning off the electric furnace. The cooling rate in this annealing treatment was about 0.1K per second. The annealed glass member was cut, ground, and polished optically using a common glass processing technique. Thus a glass sheet with its main surfaces being optically polished on both sides was obtained, having a 3.1-mm thickness and an approximately square shape with each side being about 5 cm long.

(Compositions of Glass Sheets, Glass Transition Temperature)

Table 1 indicates the above-mentioned base glass composition of the glass sheet, and Table 2 indicates the contents of the colorants. The same base glass composition is applied to all Examples, and is indicated so that the total of the contents of all the components except colorants is 100%. The values indicated in Table 2 are the proportions of respective colorants contained in each glass composition used to produce the glass sheets, and these values were obtained by quantitative analysis using general analysis methods suitable for respective components such as an X-ray fluorescence analysis, a chemical analysis, and a flame analysis. Note that all the contents indicated in these tables are expressed in mass %. Since the thermal expansion coefficient, glass transition temperature and yield point are less affected by colorants, the values thereof in the base glass composition including no colorant are indicated as they are. Note that the thermal expansion coefficient, glass transition temperature and yield point were measured using a differential thermal expansion measurement instrument (EXSTAR6000-TMA/SS manufactured by Seiko Instruments Inc.).

TABLE 1

| Composition Mass % | $SiO_2$ | 72.2 |
|---|---|---|
| | $Al_2O_3$ | 1.6 |
| | MgO | 3.2 |
| | CaO | 8.2 |
| | $Na_2O$ | 14.2 |
| | $K_2O$ | 0.6 |
| Physical properties | Thermal expansion coefficient $(\times 10^{-7} K^{-1})$ | 92 |
| | Glass transition temperature Tg (° C.) | 550 |
| | Yield point At (° C.) | 630 |

TABLE 2

(Heat tempered article)

| | Example | 1 | 2 | 3 | 4 | 5 | 6 | 7 | 8 |
|---|---|---|---|---|---|---|---|---|---|
| Analyzed composition Mass % | NiO | 0.100 | 0.150 | 0.122 | 0.122 | 0.122 | 0.122 | 0.122 | 0.122 |
| | CoO | 0.0300 | 0.0100 | 0.0160 | 0.0159 | 0.0159 | 0.0159 | 0.0159 | 0.0164 |
| | Se | 0 | 0 | 0 | 0 | 0 | 0 | 0 | 0 |
| | $CeO_2$ | 2.00 | 0.100 | 0.450 | 0.497 | 0.497 | 0.696 | 0.895 | 0.696 |
| | $TiO_2$ | 0.600 | 0.800 | 0.026 | 0.026 | 0.026 | 0.026 | 0.026 | 0.026 |
| | $T\text{-}Fe_2O_3$ | 0.600 | 0.900 | 0.980 | 0.952 | 0.952 | 0.953 | 0.953 | 0.953 |
| | FeO ratio (%) | 36.7 | 20.0 | 18.2 | 20.1 | 23.3 | 25.7 | 24.7 | 22.3 |

(Heat tempered article)

| | Example | 9 | 10 | 11 | 12 | 13 | 14 | 15 | 16 |
|---|---|---|---|---|---|---|---|---|---|
| Analyzed composition Mass % | NiO | 0.122 | 0.150 | 0.150 | 0.150 | 0.200 | 0.200 | 0.200 | 0.200 |
| | CoO | 0.0169 | 0.0150 | 0.0200 | 0.0300 | 0.0100 | 0.0150 | 0.0200 | 0.0250 |
| | Se | 0 | 0 | 0 | 0 | 0 | 0 | 0 | 0 |
| | $CeO_2$ | 0.696 | 1.50 | 2.00 | 1.50 | 2.00 | 0.100 | 1.50 | 2.00 |
| | $TiO_2$ | 0.026 | 0.200 | 0.400 | 0.800 | 0.200 | 0.400 | 0.600 | 0.800 |
| | $T\text{-}Fe_2O_3$ | 0.953 | 0.800 | 0.700 | 0.900 | 0.800 | 0.700 | 0.600 | 0.900 |
| | FeO ratio (%) | 21.2 | 25.0 | 31.4 | 22.2 | 27.5 | 25.7 | 33.3 | 24.4 |

(Heat tempered article)

| | Example | 17 | 18 | 19 | 20 | 21 | 22 | 23 | 24 | 25 |
|---|---|---|---|---|---|---|---|---|---|---|
| Analyzed composition Mass % | NiO | 0.200 | 0.122 | 0.122 | 0.122 | 0.122 | 0.122 | 0.122 | 0.115 | 0.122 |
| | CoO | 0.0300 | 0.0159 | 0.0159 | 0.0180 | 0.0200 | 0.0180 | 0.0200 | 0.0185 | 0.0175 |
| | Se | 0 | 0 | 0 | 0 | 0 | 0 | 0 | 0.0004 | 0 |
| | $CeO_2$ | 1.00 | 0.497 | 0.497 | 0.500 | 0.500 | 0.500 | 0.500 | 0.800 | 0.700 |
| | $TiO_2$ | 0.100 | 0.026 | 0.026 | 0.026 | 0.026 | 0.026 | 0.026 | 0.050 | 0.048 |
| | $T\text{-}Fe_2O_3$ | 0.800 | 0.952 | 0.952 | 0.979 | 0.979 | 0.979 | 0.979 | 0.900 | 0.940 |
| | FeO ratio (%) | 22.5 | 27.1 | 31.5 | 23.6 | 24.1 | 32.2 | 31.6 | 24.0 | 23.5 |

(Production of Heat Tempered Glass Articles)

Next, the above-mentioned glass sheets were subjected to a heat tempering process so as to produce glass articles obtained from the heat tempered glass sheets (Examples 1 through 25). This heat tempering process was carried out in such a manner that each of the above-mentioned glass sheets was heated in an electric furnace at 700° C. for 180 seconds and then cooled rapidly by blasting room-temperature air. The cooling rate in this process was about 80 to 100K per second at temperatures in the range of 550 to 650° C. As a result of this tempering process, about 90 to 110 MPa of surface compression stress was applied to all of the above-mentioned glass articles.

(Optical Properties of Heat Tempered Glass Articles)

Next, the color tones and optical properties of the above-mentioned heat tempered glass articles were evaluated. As for the color tones, the reflected light of the above-mentioned heat tempered glass articles were observed with naked eyes. Their optical properties were evaluated using an ordinary spectrophotometer for the ultraviolet to near infrared wavelength region. Table 3 shows the properties of the above heat tempered glass articles. In Table 3, $Y_A$ denotes the visible light transmittance measured with the CIE standard illuminant A, $T_G$ denotes the total solar energy transmittance, and $T_{UV}$ denotes the ultraviolet transmittance specified by ISO-9050. $\lambda d$ and $P_e$ denote the dominant wavelength and the excitation purity measured with the CIE standard illuminant C, respectively. L* denotes the lightness defined in the CIE standard, and a* and b* denote the chromaticity defined in the CIE standard. x and y denote the chromaticity coordinates in the CIE-XYZ color system, respectively.

TABLE 3

(Heat tempered article)

| | Example | 1 | 2 | 3 | 4 | 5 | 6 | 7 | 8 |
|---|---|---|---|---|---|---|---|---|---|
| Optical properties | Thickness (mm) | 3.10 | 3.10 | 3.14 | 3.12 | 3.10 | 3.12 | 3.12 | 3.12 |
| | $Y_A$ (%) | 24.4 | 27.6 | 25.1 | 24.7 | 24.4 | 23.9 | 23.9 | 24.3 |
| | $T_G$ (%) | 16.8 | 35.3 | 30.5 | 29.4 | 27.2 | 25.5 | 25.9 | 27.8 |
| | x | 0.2897 | 0.3231 | 0.3130 | 0.3127 | 0.3099 | 0.3099 | 0.3120 | 0.3114 |
| | y | 0.3107 | 0.3476 | 0.3299 | 0.3305 | 0.3284 | 0.3294 | 0.3319 | 0.3296 |
| | L* | 55.52 | 61.77 | 57.27 | 56.90 | 56.69 | 56.20 | 56.13 | 56.49 |
| | a* | −3.85 | −2.43 | −3.46 | −3.74 | −3.99 | −4.31 | −4.35 | −3.86 |
| | b* | −4.44 | 9.83 | 3.67 | 3.75 | 2.93 | 3.15 | 3.97 | 3.36 |
| | Color tone | gray | gray | gray | gray | gray | gray | gray | gray |
| | λd (nm) | 585.0 | 545.5 | 560.4 | 559.2 | 550.6 | 550.3 | 556.9 | 555.8 |
| | Pe (%) | 8.2 | 11.8 | 4.5 | 4.6 | 3.3 | 3.5 | 4.8 | 4.0 |
| | $T_{UV}$ (%) | 3.2 | 11.8 | 12.0 | 11.6 | 12.1 | 10.8 | 9.7 | 10.7 |

TABLE 3-continued

| | | (Heat tempered article) | | | | | | | |
|---|---|---|---|---|---|---|---|---|---|
| | Example | 9 | 10 | 11 | 12 | 13 | 14 | 15 | 16 |
| Optical properties | Thickness (mm) | 3.13 | 3.10 | 3.10 | 3.10 | 3.10 | 3.10 | 3.10 | 3.10 |
| | $Y_A$ (%) | 24.1 | 29.4 | 26.6 | 16.1 | 28.9 | 21.3 | 20.4 | 15.8 |
| | $T_G$ (%) | 28.2 | 26.4 | 20.3 | 17.3 | 24.1 | 26.2 | 19.4 | 16.3 |
| | x | 0.3112 | 0.3221 | 0.3219 | 0.3173 | 0.3243 | 0.3192 | 0.3228 | 0.3242 |
| | y | 0.3290 | 0.3454 | 0.3428 | 0.3268 | 0.3499 | 0.3396 | 0.3480 | 0.3497 |
| | L* | 56.33 | 59.65 | 56.61 | 47.38 | 57.64 | 54.57 | 52.10 | 46.70 |
| | a* | −3.74 | −3.08 | −3.23 | −2.85 | −3.00 | −1.57 | −1.87 | −2.69 |
| | b* | 3.20 | 7.45 | 5.84 | −1.78 | 10.52 | 6.84 | 6.94 | 6.09 |
| | Color tone | gray | gray | gray | gray | gray | gray | gray | gray |
| | λd (nm) | 555.4 | 586.7 | 577.7 | 589.4 | 578.3 | 554.8 | 576.7 | 567.6 |
| | Pe (%) | 3.8 | 3.0 | 7.8 | 3.3 | 6.3 | 4.5 | 8.0 | 6.1 |
| | $T_{UV}$ (%) | 10.5 | 9.1 | 8.3 | 2.7 | 8.6 | 12.7 | 10.6 | 2.7 |

| | | (Heat tempered article) | | | | | | | |
|---|---|---|---|---|---|---|---|---|---|
| | Example | 17 | 18 | 19 | 20 | 21 | 22 | 23 | 24 | 25 |
| Optical properties | Thickness (mm) | 3.10 | 3.11 | 3.12 | 3.10 | 3.12 | 3.12 | 3.12 | 3.10 | 3.11 |
| | $Y_A$ (%) | 16.7 | 23.8 | 23.3 | 23.1 | 21.5 | 21.7 | 20.8 | 25.0 | 22.7 |
| | $T_G$ (%) | 17.2 | 24.8 | 22.2 | 26.0 | 25.1 | 20.8 | 21.0 | 25.0 | 26.6 |
| | x | 0.3050 | 0.3076 | 0.3047 | 0.3047 | 0.3016 | 0.2991 | 0.2970 | 0.3120 | 0.3060 |
| | y | 0.3230 | 0.3273 | 0.3264 | 0.3236 | 0.3209 | 0.3214 | 0.3188 | 0.3290 | 0.3249 |
| | L* | 47.64 | 56.18 | 55.73 | 55.46 | 53.92 | 54.19 | 53.30 | 55.49 | 55.03 |
| | a* | −2.25 | −4.40 | −5.01 | −4.14 | −4.27 | −5.24 | −5.06 | −2.51 | −4.12 |
| | b* | −1.20 | 2.39 | 1.84 | 1.18 | 0.21 | 0.06 | −0.76 | 2.15 | 1.62 |
| | Color tone | gray | gray | gray | gray | gray | gray | gray | gray | gray |
| | λd (nm) | 579.0 | 536.9 | 516.0 | 508.8 | 497.8 | 496.8 | 493.4 | 576.9 | 519.5 |
| | Pe (%) | 0.6 | 2.4 | 2.0 | 1.8 | 2.9 | 3.7 | 4.7 | 2.4 | 1.7 |
| | $T_{UV}$ (%) | 11.1 | 12.3 | 12.6 | 12.0 | 11.6 | 12.6 | 12.4 | 12.1 | 9.8 |

All the heat tempered glass articles of Examples 1 through 25 exhibited a gray color tone as well as visible light transmittances ($Y_A$) in the range of 15 to 40%, which were measured with the illuminant A at a thickness of 3.1 mm.

All the heat tempered glass articles of Examples 2 through 9, 11, 13 through 18, and 24 had dominant wavelengths (λd) in the range of 530 to 580 nm, which were measured with the illuminant C at a thickness of 3.1 mm.

All the heat tempered glass articles of Examples 3 though 9, 18 through 21, 23, and 25 had colors expressed as −5≦a*≦0 and −1≦b*≦4, respectively, in the CIE-LAB color system, which were measured with the illuminant C at a thickness of 3.1 mm.

All the heat tempered glass articles of Examples 1 through 25 had ultraviolet transmittances ($T_{UV}$) of 15% or less specified by ISO-9050, which were measured at a thickness of 3.1 mm.

As is obvious from the above results, the glass articles obtained from heat tempered glass sheets showed a gray color tone as well as relatively low visible light transmittances. In particular, the glass articles in Examples 3 through 9, 18, and 24 had dominant wavelengths (λd) in the range of 530 to 580 nm, which were measured with the illuminant C, as well as colors expressed as −5≦a*≦0 and −1 b*≦4, respectively, in the CIE-LAB color system, which were measured with the illuminant C. These glass articles further had ultraviolet transmittances ($T_{UV}$) of 15% or less specified by ISO-9050. Therefore, these glass articles can be used suitably for vehicle windows as window glasses for privacy glazing.

Examples 41 through 65

Production of Annealed Glass Articles

Glass members were prepared according the same procedure as in Examples 1 through 25 and were processed in the same manner as in Examples 1 through 25, and thus glass sheets with their main surfaces being optically polished on both sides were prepared, having a 3.1-mm thickness and an approximately square shape with each side being about 5 cm long. Table 1 shows the base glass composition of the glass sheets thus prepared, and Table 4 shows the contents of colorants. These glass sheets were used as annealed glass articles (Examples 41 through 65) without modification.

TABLE 4

| | | (Annealed article) | | | | | | | |
|---|---|---|---|---|---|---|---|---|---|
| | Example | 41 | 42 | 43 | 44 | 45 | 46 | 47 | 48 |
| Analyzed composition Mass % | NiO | 0.100 | 0.150 | 0.122 | 0.122 | 0.122 | 0.122 | 0.122 | 0.122 |
| | CoO | 0.0300 | 0.0100 | 0.0160 | 0.0159 | 0.0159 | 0.0159 | 0.0159 | 0.0164 |
| | Se | 0 | 0 | 0 | 0 | 0 | 0 | 0 | 0 |
| | $CeO_2$ | 2.00 | 0.100 | 0.450 | 0.497 | 0.497 | 0.696 | 0.895 | 0.696 |
| | $TiO_2$ | 0.600 | 0.800 | 0.026 | 0.026 | 0.026 | 0.026 | 0.026 | 0.026 |
| | T-$Fe_2O_3$ | 0.600 | 0.900 | 0.980 | 0.952 | 0.952 | 0.953 | 0.953 | 0.953 |
| | FeO ratio (%) | 36.7 | 20.0 | 18.2 | 20.1 | 23.3 | 25.7 | 24.7 | 22.3 |

TABLE 4-continued

|  |  | (Annealed article) | | | | | | | |
|---|---|---|---|---|---|---|---|---|---|
|  | Example | 49 | 50 | 51 | 52 | 53 | 54 | 55 | 56 |
| Analyzed composition Mass % | NiO | 0.122 | 0.150 | 0.150 | 0.150 | 0.200 | 0.200 | 0.200 | 0.200 |
|  | CoO | 0.0169 | 0.0150 | 0.0200 | 0.0300 | 0.0100 | 0.0150 | 0.0200 | 0.0250 |
|  | Se | 0 | 0 | 0 | 0 | 0 | 0 | 0 | 0 |
|  | $CeO_2$ | 0.696 | 1.50 | 2.00 | 1.50 | 2.00 | 0.100 | 1.50 | 2.00 |
|  | $TiO_2$ | 0.026 | 0.200 | 0.400 | 0.800 | 0.200 | 0.400 | 0.600 | 0.800 |
|  | $T\text{-}Fe_2O_3$ | 0.953 | 0.800 | 0.700 | 0.900 | 0.800 | 0.700 | 0.600 | 0.900 |
|  | FeO ratio (%) | 21.2 | 25.0 | 31.4 | 22.2 | 27.5 | 25.7 | 33.3 | 24.4 |

|  |  | (Annealed article) | | | | | | | |
|---|---|---|---|---|---|---|---|---|---|
|  | Example | 57 | 58 | 59 | 60 | 61 | 62 | 63 | 64 | 65 |
| Analyzed composition Mass % | NiO | 0.200 | 0.122 | 0.122 | 0.122 | 0.122 | 0.122 | 0.122 | 0.115 | 0.122 |
|  | CoO | 0.0300 | 0.0159 | 0.0159 | 0.0180 | 0.0200 | 0.0180 | 0.0200 | 0.0185 | 0.0175 |
|  | Se | 0 | 0 | 0 | 0 | 0 | 0 | 0 | 0.0004 | 0 |
|  | $CeO_2$ | 1.00 | 0.497 | 0.497 | 0.500 | 0.500 | 0.500 | 0.500 | 0.800 | 0.700 |
|  | $TiO_2$ | 0.100 | 0.026 | 0.026 | 0.026 | 0.026 | 0.026 | 0.026 | 0.050 | 0.048 |
|  | $T\text{-}Fe_2O_3$ | 0.800 | 0.952 | 0.952 | 0.979 | 0.979 | 0.979 | 0.979 | 0.900 | 0.940 |
|  | FeO ratio (%) | 22.5 | 27.1 | 31.5 | 23.6 | 24.1 | 32.2 | 31.6 | 24.0 | 23.5 |

(Optical Properties of Annealed Glass Articles)

Next, the color tones and optical properties of the above annealed glass articles were evaluated. The evaluation was carried out in the same manner as in Examples 1 through 25. Table 5 shows the results thereof.

TABLE 5

|  |  | (Annealed article) | | | | | | | |
|---|---|---|---|---|---|---|---|---|---|
|  | Example | 41 | 42 | 43 | 44 | 45 | 46 | 47 | 48 |
| Optical properties | Thickness (mm) | 3.10 | 3.10 | 3.14 | 3.12 | 3.10 | 3.12 | 3.12 | 3.12 |
|  | $Y_A$ (%) | 24.7 | 32.6 | 28.5 | 27.9 | 27.8 | 27.4 | 27.3 | 27.8 |
|  | $T_G$ (%) | 16.7 | 36.2 | 31.2 | 30.0 | 28.0 | 26.5 | 26.6 | 28.6 |
|  | x | 0.2875 | 0.3297 | 0.3182 | 0.3173 | 0.3148 | 0.3151 | 0.3168 | 0.3164 |
|  | y | 0.3224 | 0.3582 | 0.3449 | 0.3448 | 0.3434 | 0.3449 | 0.3469 | 0.3449 |
|  | L* | 57.81 | 63.64 | 60.49 | 59.93 | 59.95 | 59.58 | 59.45 | 59.87 |
|  | a* | −4.98 | −7.51 | −6.66 | −6.87 | −7.28 | −7.62 | −7.62 | −7.19 |
|  | b* | −0.92 | 12.19 | 8.12 | 7.93 | 7.29 | 7.66 | 8.32 | 7.84 |
|  | Color tone | gray | gray | gray | gray | gray | gray | gray | gray |
|  | λd (nm) | 490.0 | 577.1 | 562.6 | 561.7 | 558.9 | 558.9 | 560.6 | 560.6 |
|  | Pe (%) | 5.6 | 15.0 | 9.9 | 9.6 | 8.6 | 9.1 | 10.1 | 9.4 |
|  | Tuv (%) | 5.5 | 12.4 | 14.5 | 14.0 | 14.7 | 13.1 | 11.8 | 13.0 |

|  |  | (Annealed article) | | | | | | | |
|---|---|---|---|---|---|---|---|---|---|
|  | Example | 49 | 50 | 51 | 52 | 53 | 54 | 55 | 56 |
| Optical properties | Thickness (mm) | 3.13 | 3.10 | 3.10 | 3.10 | 3.10 | 3.10 | 3.10 | 3.10 |
|  | $Y_A$ (%) | 27.5 | 31.9 | 27.9 | 17.9 | 31.2 | 26.2 | 23.1 | 17.5 |
|  | $T_G$ (%) | 29.0 | 27.2 | 20.8 | 17.6 | 25.1 | 27.2 | 19.6 | 16.7 |
|  | x | 0.3162 | 0.3292 | 0.3259 | 0.3093 | 0.3307 | 0.3250 | 0.3292 | 0.3302 |
|  | y | 0.3443 | 0.3615 | 0.3586 | 0.3553 | 0.3632 | 0.3603 | 0.3629 | 0.3633 |
|  | L* | 59.69 | 61.10 | 58.02 | 49.95 | 58.14 | 57.91 | 54.11 | 48.76 |
|  | a* | −7.06 | −5.48 | −5.12 | −6.28 | −5.47 | −6.42 | −5.57 | −6.37 |
|  | b* | 7.67 | 12.59 | 12.09 | 11.39 | 12.92 | 12.06 | 12.64 | 12.36 |
|  | Color tone | gray | gray | gray | gray | gray | gray | gray | gray |
|  | λd (nm) | 560.5 | 569.4 | 568.5 | 515.6 | 578.2 | 569.8 | 575.2 | 573.4 |
|  | Pe (%) | 9.2 | 8.4 | 9.5 | 7.9 | 4.3 | 14.1 | 9.1 | 8.8 |
|  | $T_{UV}$ (%) | 12.9 | 8.7 | 6.0 | 3.5 | 6.1 | 18.6 | 6.6 | 3.4 |

|  |  | (Annealed article) | | | | | | | |
|---|---|---|---|---|---|---|---|---|---|
|  | Example | 57 | 58 | 59 | 60 | 61 | 62 | 63 | 64 | 65 |
| Optical properties | Thickness (mm) | 3.10 | 3.11 | 3.12 | 3.10 | 3.12 | 3.12 | 3.12 | 3.10 | 3.11 |
|  | $Y_A$ (%) | 20.3 | 27.1 | 26.5 | 26.2 | 24.4 | 24.7 | 23.7 | 27.2 | 27.4 |
|  | $T_G$ (%) | 18.0 | 25.4 | 22.8 | 26.6 | 25.6 | 21.5 | 21.6 | 25.9 | 28.0 |
|  | x | 0.3118 | 0.3123 | 0.3095 | 0.3094 | 0.3059 | 0.3037 | 0.3015 | 0.3121 | 0.3141 |
|  | y | 0.3563 | 0.3427 | 0.3419 | 0.3386 | 0.3361 | 0.3369 | 0.3344 | 0.3409 | 0.3426 |
|  | L* | 52.09 | 59.42 | 58.96 | 58.58 | 56.99 | 57.37 | 56.43 | 57.41 | 59.59 |
|  | a* | −5.78 | −7.88 | −8.53 | −7.51 | −7.73 | −8.77 | −8.63 | −4.63 | −7.23 |

TABLE 5-continued

|  |  |  |  |  |  |  |  |  |
|---|---|---|---|---|---|---|---|---|
| b* | 10.17 | 6.78 | 6.23 | 5.40 | 4.30 | 4.25 | 3.37 | 5.45 | 7.00 |
| Color tone | gray | gray | gray | gray | gray | gray | gray | gray | gray |
| λd (nm) | 558.9 | 555.1 | 550.0 | 549.6 | 538.1 | 530.5 | 518.9 | 562.1 | 558.1 |
| Pe (%) | 4.3 | 7.8 | 6.8 | 5.9 | 4.4 | 4.2 | 3.5 | 2.5 | 8.2 |
| $T_{UV}$ (%) | 9.3 | 14.8 | 15.0 | 14.5 | 14.0 | 15.0 | 14.9 | 11.9 | 12.5 |

All the annealed glass articles of Examples 41 through 65 exhibited a gray color tone as well as visible light transmittances ($Y_A$) in the range of 15 to 40%, which were measured with the illuminant A at a thickness of 3.1 mm.

All the annealed glass articles of Examples 42 through 51, 53 through 62, and 65 had dominant wavelengths (λd) in the range of 530 to 580 nm, which were measured with the illuminant C at a thickness of 3.1 mm.

The annealed glass article of Example 41 had a color expressed as −5≦a*≦0 and −1≦b*≦4 in the CIE-LAB color system, which was measured with the illuminant C at a thickness of 3.1 mm.

All the annealed glass articles of Examples 41 through 53, and 55 through 65 had ultraviolet transmittances ($T_{UV}$) of 15% or less specified by ISO-9050, which were measured at a thickness of 3.1 mm.

All the annealed glass articles of Examples 41 through 65 had colors expressed as −9≦a*≦−4 and −5≦b*≦13 in the CIE-LAB color system, which were measured with the illuminant C at a thickness of 3.1 mm.

As is obvious from the above results, the glass articles obtained from the annealed glass sheets exhibited a gray color, and had relatively low visible light transmittances. In particular, the glass article of Example 41 had a color expressed as −5≦a*≦0 and −1≦b*≦4 in the CIE-LAB color system, which was measured with the illuminant C, and further had an ultraviolet transmittance ($T_{UV}$) of 15% or less specified by ISO-9050. Therefore, this glass article can be used suitably for a vehicle window as a window glass for privacy glazing, as is the case with the heat tempered glass articles.

COMPARATIVE EXAMPLES

Comparative Examples 80a through 85a, and 80b through 85b are glass articles using glass sheets made of the glass composition disclosed in JP10 (1998)-114540A. In Comparative Examples 80a through 85a, annealed glass sheets were used, whereas in Comparative Examples 80b through 85b, heat tempered glass sheets were used. Although all of these glass articles had bluish green or deep green colors, none of them exhibited a grayish color tone. Table 6 shows their compositions and optical properties.

TABLE 6

| | | Comparative example | | | | | |
|---|---|---|---|---|---|---|---|
| | | 80a | 80b | 81a | 81b | 82a | 82b |
| Composition Mass % | $SiO_2$ | 71 | 71 | 71 | 71 | 71 | 71 |
| | $Al_2O_3$ | 1.6 | 1.6 | 1.6 | 1.6 | 1.6 | 1.6 |
| | MgO | 3.6 | 3.6 | 3.6 | 3.6 | 3.6 | 3.6 |
| | CaO | 7.7 | 7.7 | 7.7 | 7.7 | 7.7 | 7.7 |
| | $Na_2O$ | 13.7 | 13.7 | 13.7 | 13.7 | 13.7 | 13.7 |
| | $K_2O$ | 0.9 | 0.9 | 0.9 | 0.9 | 0.9 | 0.9 |
| | NiO | 0.0330 | 0.0330 | 0.0330 | 0.0330 | 0.0330 | 0.0330 |
| | CoO | 0.0120 | 0.0120 | 0.0125 | 0.0125 | 0.0120 | 0.0120 |
| | Se | 0 | 0 | 0 | 0 | 0 | 0 |
| | $CeO_2$ | 0 | 0 | 0 | 0 | 0 | 0 |
| | $TiO_2$ | 0.03 | 0.03 | 0.03 | 0.03 | 0.03 | 0.03 |
| | $T\text{-}Fe_2O_3$ | 1.3 | 1.3 | 1.3 | 1.3 | 1.3 | 1.3 |
| | FeO ratio (%) | 17 | 17 | 17 | 17 | 17 | 17 |
| Optical properties | $Y_A$ (%) | 38.8 | 37.2 | 37.2 | 35.9 | 37.8 | 36.3 |
| | $T_G$ (%) | 31.4 | 31.2 | 30.5 | 30.5 | 30.3 | 29.9 |
| | L* | 69.50 | 58.38 | 68.37 | 67.25 | 68.79 | 67.59 |
| | a* | −9.47 | −8.31 | −9.45 | −8.32 | −9.48 | −8.36 |
| | b* | 0.78 | 0.59 | 0.14 | 0.01 | −0.31 | −0.34 |
| | Color tone | green | green | green | green | green | green |
| | λd (nm) | 498.9 | 498.5 | 496.9 | 496.5 | 495.8 | 495.5 |
| | Pe (%) | 4.89 | 4.43 | 5.56 | 0.58 | 5.99 | 5.42 |
| | $T_{UV}$ (%) | 6.73 | 5.06 | 6.35 | 4.73 | 6.99 | 5.14 |
| Heat tempered | | no | yes | no | yes | no | yes |

| | | Comparative example | | | | | |
|---|---|---|---|---|---|---|---|
| | | 83a | 83b | 84a | 84b | 85a | 85b |
| Composition Mass % | $SiO_2$ | 71 | 71 | 71 | 71 | 71 | 71 |
| | $Al_2O_3$ | 1.6 | 1.6 | 1.6 | 1.6 | 1.6 | 1.6 |
| | MgO | 3.6 | 3.6 | 3.6 | 3.6 | 3.6 | 3.6 |
| | CaO | 7.7 | 7.7 | 7.7 | 7.7 | 7.7 | 7.7 |
| | $Na_2O$ | 13.7 | 13.7 | 13.7 | 13.7 | 13.7 | 13.7 |
| | $K_2O$ | 0.9 | 0.9 | 0.9 | 0.9 | 0.9 | 0.9 |
| | NiO | 0.1000 | 0.1000 | 0.1000 | 0.1000 | 0.0900 | 0.0900 |
| | CoO | 0.0190 | 0.0190 | 0.0180 | 0.0180 | 0.0190 | 0.0190 |
| | Se | 0 | 0 | 0 | 0 | 0 | 0 |
| | $CeO_2$ | 0 | 0 | 0 | 0 | 0 | 0 |

TABLE 6-continued

|  |  |  |  |  |  |  |  |
|---|---|---|---|---|---|---|---|
|  | $TiO_2$ | 0.03 | 0.03 | 0.03 | 0.03 | 0.03 | 0.03 |
|  | $T\text{-}Fe_2O_3$ | 1.3 | 1.3 | 1.3 | 1.3 | 1.3 | 1.3 |
|  | FeO ratio (%) | 16 | 16 | 18 | 18 | 19 | 19 |
| Optical | $Y_A$ (%) | 20.2 | 17.8 | 20.2 | 17.7 | 20.4 | 18.1 |
| properties | $T_G$ (%) | 21.7 | 21.2 | 20.3 | 19.7 | 19.8 | 19.3 |
|  | $L^*$ | 52.54 | 49.63 | 52.63 | 49.54 | 53.01 | 50.27 |
|  | $a^*$ | −9.1 | −6.27 | −9.39 | −6.25 | −9.64 | −6.76 |
|  | $b^*$ | 6.72 | 3.77 | 6.19 | 2.96 | 3.39 | 0.69 |
|  | Color tone | green | green | green | green | green | green |
|  | $\lambda d$ (nm) | 550.3 | 542.4 | 545.9 | 529.1 | 514.9 | 499.5 |
|  | Pe (%) | 8.16 | 4.46 | 7.22 | 3.28 | 4.1 | 4.36 |
|  | $T_{UV}$ (%) | 5.86 | 4.18 | 6.78 | 4.84 | 6.56 | 4.74 |
| Heat tempered |  | no | yes | no | yes | no | yes |

(Comparison Between Heat Tempered Glass Articles and Annealed Glass Articles)

Figure 1:
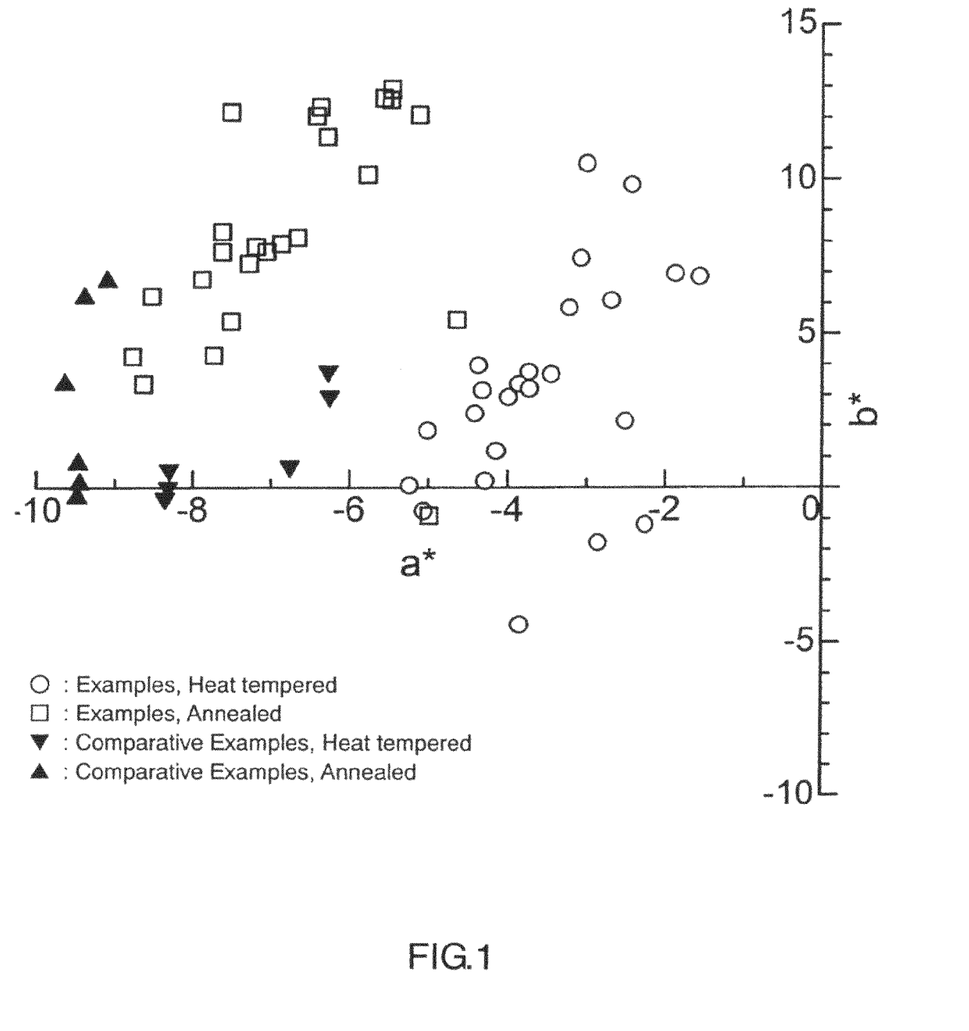
FIG. 1 is a diagram showing color coordinates of a heat tempered glass article and an annealed-glass article in Examples and Comparative Examples of the present invention.

The differences in color tone among glass articles obtained from glass sheets made of the same composition but cooled at different cooling rates were compared using the above-described Examples 1 through 25 (heat tempered articles) and Examples 41 through 65 (annealed articles). As is obvious from Tables 2 and 4, Examples 1 through 25 and Examples 41 through 65 correspond one to one. FIG. 1 is a diagram showing their color coordinates expressed in the CIE-LAB color system. This figure shows that in all Examples, the color coordinates of the glass articles, after being heat tempered, were shifted toward the lower right, that is, the origin of the coordinate system. In other words, it is possible to obtain easily a glass article having a grayish, almost neutral color by using an heat tempered glass sheet. In particular, it is possible more easily to obtain glass articles having colors expressed as $-5 \leq a^* \leq 0$ and $-1 \leq b^* \leq 4$ by using annealed glass sheets having the above-mentioned color coordinates in the ranges of $-9 \leq a^* \leq -6$ and $3 \leq b^* \leq 9$, as shown in Examples 43 through 49, and 58 through 65.

In sum, when a sheet-formed body like a glass sheet or a glass ribbon obtained by a technique such as a float process has a color expressed as $-9 \leq a^* \leq -4$ and $-5 \leq b^* \leq 13$ in the CIE-LAB color system, which is measured with the illuminant C at a thickness of 3.1 mm, this glass sheet or glass ribbon can be heat tempered so that it has a color in the ranges of $-5 \leq a^* \leq 0$ and $-1 \leq b^* \leq 4$ (so that the color coordinates shift to these ranges). By doing so, it is possible to obtain easily a glass article having a grayish, almost neutral color.

On the other hand, the above-mentioned color coordinates of the glass articles of Comparative Examples 80a through 85a were not in the ranges of $-9 \leq a^* \leq -4$ and $-5 \leq b^* \leq 13$. In particular, the values of $a^*$ were smaller than −9. Therefore, it can be said that the color coordinates of the glass articles of Comparative Examples 80b through 85b obtained by heat tempering of these glass sheets were not in the ranges of $-5 \leq a^* \leq 0$ and $-1 \leq b^* \leq 4$, and thus did not exhibit a grayish color tone.

Furthermore, it is apparent from Examples of the present invention that the distance between the color coordinates of each pair of the annealed glass article and the heat tempered glass article is longer than that in Comparative Examples. Therefore, the present invention can provide a glass article having a grayish color tone more easily.

(Change in Color According to Cooling Rate and by Re-Annealing of Heat Tempered Glass Article)

Furthermore, glass articles were produced by cooling glass sheets having a composition of Example 25 as well as a 3.1-mm thickness and an approximately square shape with each side being about 5 cm long, at cooling rates of 0.1K, 4K, 18K, and 95K per second, respectively. The optical properties of these glass articles were evaluated in the same manner as in the above-mentioned Examples. Table 7 and FIG. 2 show the results thereof.

TABLE 7

|  |  | 0.1 (Annealed) | 4 (Heat tempered) | 18 (Heat tempered) | 95 (Heat tempered) | 0.1 (Re-annealed after heat tempered) |
|---|---|---|---|---|---|---|
|  | Cooling rate (K/s) |  |  |  |  |  |
| Optical | $Y_A$ (%) | 27.4 | 23.4 | 24.1 | 22.7 | 27.4 |
| properties | $T_G$ (%) | 28.0 | 25.6 | 26.8 | 26.6 | 28.0 |
|  | $L^*$ | 59.59 | 55.72 | 56.49 | 55.03 | 59.56 |
|  | $a^*$ | −7.23 | −5.00 | −4.62 | −4.12 | −7.24 |
|  | $b^*$ | 7.00 | 3.34 | 2.82 | 1.62 | 6.98 |
|  | $\lambda d$ (nm) | 558.1 | 546.5 | 543.1 | 519.5 | 588.1 |
|  | Pe (%) | 8.2 | 3.7 | 3.0 | 1.7 | 8.2 |
|  | $T_{UV}$ (%) | 12.5 | 9.2 | 10.7 | 9.8 | 12.4 |

Figure 2:
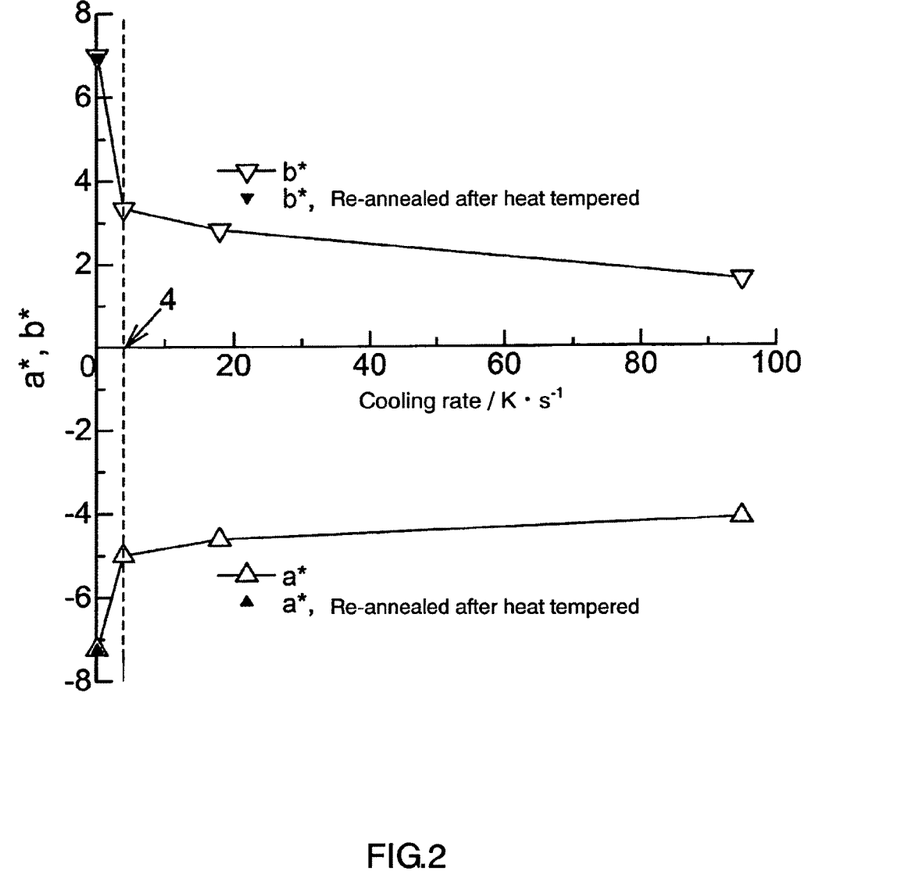
FIG. 2 is a diagram showing cooling-rate dependence of the color coordinates of the glass articles in Examples of the present invention.

As is apparent from Table 7 and FIG. 2, the color coordinates of the glass articles cooled at the cooling rates of 4K or higher per second were in the ranges of $-5 \leq a^* \leq 0$ and $-1 \leq b^* \leq 4$.

In addition, a re-annealed glass article was produced by re-annealing the glass article obtained from the heat tempered glass sheet described in Example 25. This re-annealing was carried out by heating the glass article of Example 25 in an electric furnace up to 650° C. for 6 hours, keeping it in the electric furnace for 30 minutes, and then cooling it to room temperature by turning off the electric furnace. The optical properties of this re-annealed glass article was evaluated in the same manner as in the above Examples. Table 7 shows the result thereof.

It is apparent from Table 7 that when the heat tempered glass article is re-annealed, the optical properties thereof are about the same as those of the glass article obtained from the annealed glass sheet, and the difference between them is within the margin of measurement error.

Accordingly, it is expected that these glasses of Examples can exhibit excellent effects of preventing degradation of interior materials as well as of protecting privacy when they are used for window glasses of vehicles and buildings, and the like.

INDUSTRIAL APPLICABILITY

The glass composition of the present invention and the glass article made of the glass composition can suitably be used for applications such as window glasses of vehicles and buildings.

The invention claimed is:

1. A glass article using a glass composition consisting essentially of: a base glass composition; and colorants,
wherein the base glass composition consists essentially of, expressed in mass %:
65 to 80% of $SiO_2$;
0 to 5% of $Al_2O_3$;
0 to 10% of MgO;
5 to 15% of CaO;
5 to 15% of MgO+CaO;
10 to 18% of $Na_2O$;
0 to 5% of $K_2O$;
10 to 20% of $Na_2O + K_2O$; and
0 to 5% of $B_2O_3$,
the colorants consist essentially of, expressed in mass %:
at least 0.70% to less than 0.95% of $T\text{-}Fe_2O_3$ (where $T\text{-}Fe_2O_3$ is a total iron oxide obtained by expressing the total amount of iron compounds as $Fe_2O_3$);
0.026 to 0.8% of $TiO_2$;
0.10 to 2.0% of $CeO_2$;
0.01 to 0.03% of CoO; and
0.06 to 0.20% of NiO,
the glass article is heat tempered,
the glass article has a grayish color tone, and has a visible light transmittance in a range of 15% to 40%, which is measured with the illuminant A at a thickness of 3.1 mm for the glass article, and
the glass article has a color expressed as $-5 \leq a^* \leq 0$ and $-1 \leq b^* \leq 4$ in the CIE-LAB color system, which is measured with the illuminant C at a thickness of 3.1 mm for the glass article.

2. The glass article according to claim 1, using a glass sheet comprising the glass composition,
wherein the glass sheet is cooled at a rate of 4K or higher per second.

3. The glass article according to claim 1,
wherein a dominant wavelength of the glass article is in a range of 530 nm to 580 nm, which is measured with the illuminant C at a thickness of 3.1 mm for the glass article.

4. The glass article according to claim 1,
wherein the glass article further has an ultraviolet transmittance of 15% or less specified by ISO, which is measured at a thickness of 3.1 mm for the glass article.

5. A method of producing a glass article with a grayish color tone, comprising:
a step A of obtaining a sheet-formed body from a glass composition consisting essentially of: a base glass composition; and colorants; and
a step B of cooling, at a rate of 4K or higher per second, the sheet-formed body that is in a state of a higher temperature than a glass transition temperature of the glass composition,
wherein the base glass composition consists essentially of, expressed in mass %:
65 to 80% of $SiO_2$;
0 to 5% of $Al_2O_3$;
0 to 10% of MgO;
5 to 15% of CaO;
5 to 15% of MgO+CaO;
10 to 18% of $Na_2O$;
0 to 5% of $K_2O$;
10 to 20% of $Na_2O + K_2O$; and
0 to 5% of $B_2O_3$, and
the colorants consist essentially of, expressed in mass %:
at least 0.70% to less than 0.95% of $T\text{-}Fe_2O_3$ (where $T\text{-}Fe_2O_3$ is a total iron oxide obtained by expressing the total amount of iron compounds as $Fe_2O_3$);
0.026 to 0.8% of $TiO_2$;
0.10 to 2.0% of $CeO_2$;
0.01 to 0.03% of CoO; and
0.06 to 0.20% of NiO, and
in the step B, the sheet-formed body receives a heat tempering treatment, and
after the step B the sheet-formed body has the color expressed with a* and b* to the color of $-5 \leq a^* \leq 0$ and $-1 \leq b^* \leq 4$ in the CIE-LAB color system, which is measured with the illuminant C at thickness of 3.1 mm for the glass article.

6. The method of producing a glass article with a grayish color tone according to claim 5,
wherein the sheet-formed body obtained in the step A has a color expressed as $-9 \leq a^* \leq -4$ and $-5 \leq b^* \leq 13$ in the CIE-LAB color system, which is measured with the illuminant C at a thickness of 3.1 mm for the sheet-formed body.

7. The glass article according to claim 1,
wherein the $TiO_2$ is included in a range of 0.026% to 0.4%, expressed in mass %.

8. The glass article according to claim 1, wherein the $CeO_2$ is included in the glass article in the amount of 0.10 to 1.2%, expressed in mass %.

9. The glass article according to claim 1, wherein the $CeO_2$ is included in the glass article in the amount of 0.50 to 2.0%, expressed in mass %.

10. A glass article using a glass composition consisting essentially of: a base glass composition; and colorants,
wherein the base glass composition consists essentially of, expressed in mass %:
65 to 80% of $SiO_2$;
0 to 5% of $Al_2O_3$;
0 to 10% of MgO;

5 to 15% of CaO;
5 to 15% of MgO +CaO;
10 to 18% of $Na_2O$;
0 to 5% of $K_2O$;
10 to 20% of $Na_2O$ +$K_2O$; and
0 to 5% of $B_2O_3$,
the colorants consist essentially of, expressed in mass %:
at least 0.70% to less than 0.95% of T-$Fe_2O_3$ (where T-$Fe_2O_3$ is a total iron oxide obtained by expressing the total amount of iron compounds as $Fe_2O_3$);
0.026 to 0.8% of $TiO_2$;
0.10 to 2.0% of $CeO_2$;
0.01 to 0.03% of CoO; and
0.06 to 0.20% of NiO,
the glass article is heat tempered,
the glass article has a grayish color tone, and has a visible light transmittance in a range of 15% to 40%, which is measured with the illuminant A at a thickness of 3.1 mm for the glass article.

* * * * *